US007572418B2

(12) United States Patent
Horta et al.

(10) Patent No.: US 7,572,418 B2
(45) Date of Patent: Aug. 11, 2009

(54) PROCESS TO OBTAIN TITANIUM CONCENTRATES WITH HIGH CONTENTS OF $TIO_2$ AND LOW CONTENTS OF RADIONUCLIDE ELEMENTS FROM ANATASE MECHANICAL CONCENTRATES

(75) Inventors: Ronaldo De Moreira Horta, Minas Gerais (BR); Lino Rodrigues De Freitas, Minas Gerais (BR); João Alberto Lessa Tude, Bahia (BR)

(73) Assignee: Companhia Vale do Rio Doce, Minas Gerals (BR)

( * ) Notice: Subject to any disclaimer, the term of this patent is extended or adjusted under 35 U.S.C. 154(b) by 450 days.

(21) Appl. No.: 10/577,547

(22) PCT Filed: Oct. 18, 2004

(86) PCT No.: PCT/BR2004/000204

§ 371 (c)(1),
(2), (4) Date: Apr. 28, 2006

(87) PCT Pub. No.: WO2005/042405

PCT Pub. Date: May 12, 2005

(65) Prior Publication Data

US 2007/0148066 A1    Jun. 28, 2007

(30) Foreign Application Priority Data

Oct. 28, 2003   (BR) .................................. 0304443

(51) Int. Cl.
*B01D 11/00*   (2006.01)
*C01G 23/047*  (2006.01)
*C22B 34/12*   (2006.01)

(52) U.S. Cl. .............................. 423/82; 423/20; 423/74; 423/83; 423/150.1; 75/416; 75/419; 75/711; 75/743

(58) Field of Classification Search ...................... 423/3, 423/20, 74, 82, 83, 132, 148, 150.1, 150.4, 423/150.6, 155, 299, 324, 80; 209/10, 11, 209/12.1, 39; 75/416, 419, 711, 712, 743
See application file for complete search history.

(56) References Cited

U.S. PATENT DOCUMENTS 3,295,924 A    1/1967  Colombo ...................... 23/143

(Continued)

FOREIGN PATENT DOCUMENTS

FR          2470167          5/1981

(Continued)

*Primary Examiner*—Roy King
*Assistant Examiner*—Brian Walck
(74) *Attorney, Agent, or Firm*—Jacobson Holman PLLC

(57) ABSTRACT

A process for production of titanium concentrate with low contents of radionuclide elements from anatase mechanical concentrates. The process involves calcination in air and reduction with hydrogen or any other reducing gas, both in fluidized bed reactor or rotary kiln, low-intensity magnetic separation of the reduced product, high-intensity magnetic separation of the non-magnetic fraction resulting from the low-intensity magnetic separation, hydrochloric acid leaching of the product of high-intensity magnetic separation, filtering and dewatering of the leached product, high temperature oxidation of the dewatered material, cooling of the oxidized ore, hydrochloric acid leaching of the oxidation product in the presence of sodium fluoride, filtration and drying of the product of the second leaching and high intensity magnetic separation, the non-magnetic fraction of this final magnetic separation becoming the end product.

7 Claims, 1 Drawing Sheet

U.S. PATENT DOCUMENTS

| | | | |
|---|---|---|---|
| 3,784,670 A | | 1/1974 | Yamada et al. .................. 423/80 |
| 4,058,393 A | * | 11/1977 | McLaughlin .................. 423/82 |
| 4,256,266 A | | 3/1981 | Megalhaes .................... 241/20 |
| 5,578,109 A | * | 11/1996 | Harris et al. .................... 75/399 |
| 5,826,162 A | * | 10/1998 | Aral et al. ...................... 423/20 |
| 5,885,536 A | * | 3/1999 | Hollitt ........................... 423/84 |
| 2003/0129113 A1 | * | 7/2003 | Hollitt et al. ................... 423/69 |

FOREIGN PATENT DOCUMENTS

| | | |
|---|---|---|
| GB | 1431552 | 4/1976 |
| GB | 1568333 | 5/1980 |

* cited by examiner

PROCESS TO OBTAIN TITANIUM CONCENTRATES WITH HIGH CONTENTS OF TIO$_2$ AND LOW CONTENTS OF RADIONUCLIDE ELEMENTS FROM ANATASE MECHANICAL CONCENTRATES

This is a nationalization of PCT/BR04/000204 filed Oct. 18, 2004 and published in English.

FIELD OF THE INVENTION

This invention relates to a process for obtaining titanium concentrates with a high TiO$_2$ content and low contents of radionuclide elements from anatase mechanical concentrates.

The main advantage of this process is to obtain a better quality titanium concentrate when compared to other raw materials used in the chloride route of titanium dioxide pigment manufacture.

Such technology constitutes a major breakthrough for the processing of anatase mechanical concentrates.

SUMMARY OF THE INVENTION

The present invention further relates to the unique use of several known state-of-the-art unit operations, in such a way that an appropriate sequence among them becomes quite effective in producing the titanium beneficiate from anatase mechanical concentrates. For purposes of the present invention, anatase mechanical concentrate is defined as the material resulting from the use of the following sequence of unit operations in processing raw anatase ores: scrubbing in a washing drum, crushing, screening, classification, grinding, in such a way that the particle size distribution of the concentrate lies between 1.0 mm and 0.074 mm, followed by low intensity (800 Gauss) and medium intensity (2000 Gauss) magnetic separations, the 2000-Gauss non-magnetic fraction becoming the anatase concentrate.

DETAILED DESCRIPTION OF THE INVENTION

Figure 1:
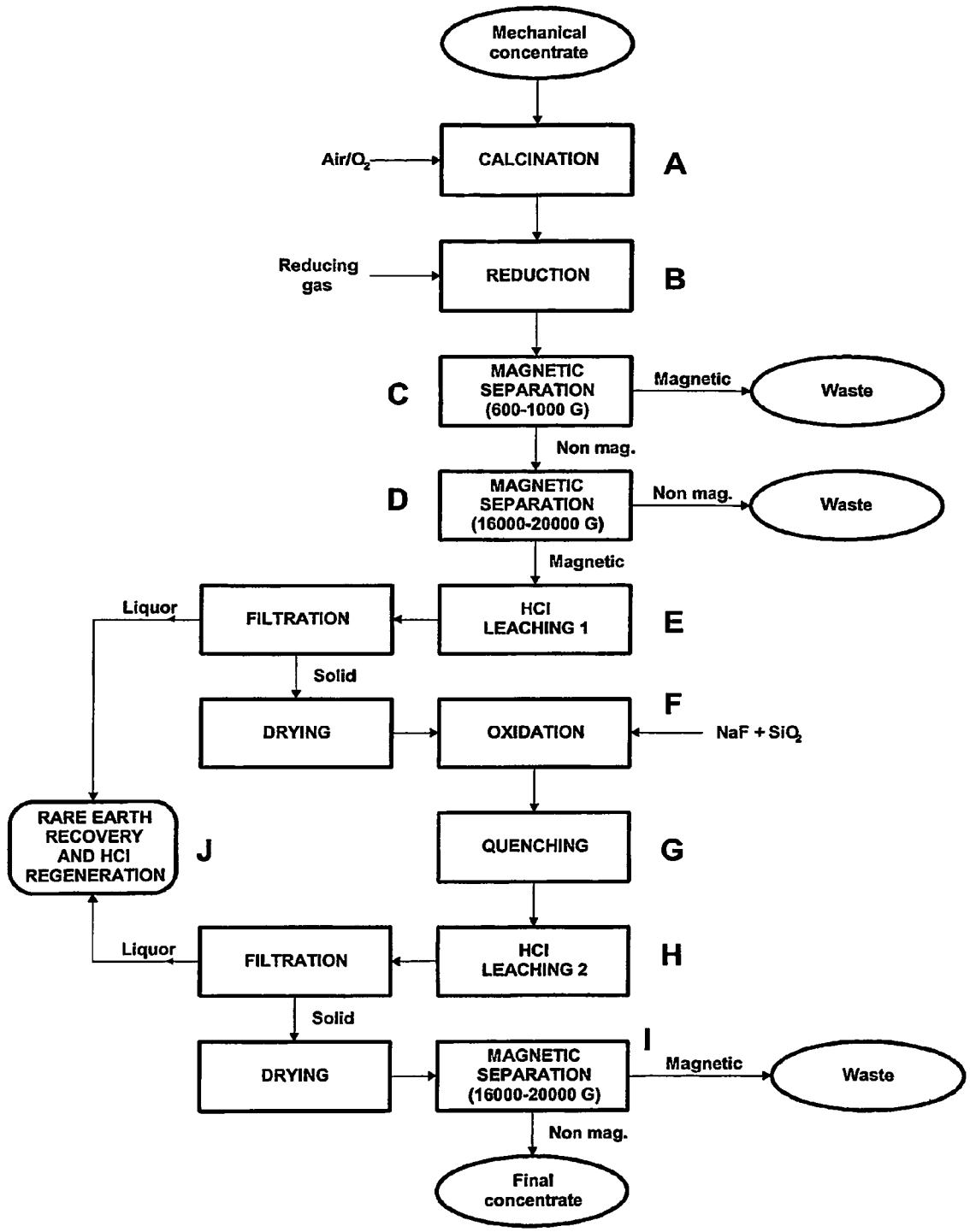
FIG. 1 is a representation of the process to obtain titanium concentrates with high contents of TiO$_2$ and low contents of radionuclide elements from anatase mechanical concentrates according to the present invention.

The process related to the present invention starts with calcination (A) in a temperature ranging from 400° C. to 550° C., between 30 minutes and 1 hour, with air injection, reduction (B) with hydrogen, carbon monoxide, natural gas or any other reducing gas in the same temperature range, with a residence time between 5 and 30 minutes followed by low-intensity (600 to 1000 Gauss) magnetic separation (C). In the current technological state-of-the-art, the use of calcination prior to the reduction step is known, although in a higher temperature (750° C.). It has been discovered that by reducing the calcination temperature from 750° C. to 500° C. it is possible to lower the reduction time from 60 minutes to between 5 and 30 minutes.

The magnetic fraction from low intensity magnetic separation—synthetic magnetite—is rejected and the non-magnetic fraction undergoes dry, high-intensity (16000 to 20000 Gauss) magnetic separation (D) with rare earth magnet, either drum or roll, in order to extract silicates, secondary phosphates, monazite, calzirtite, zirconolite and uranium and thorium containing minerals. Using electrostatic separation for the same purpose is also currently known. However, it has been discovered that high-intensity magnetic separation in magnetic separators with rare-earth permanent magnets leads to magnetic titanium concentrates of higher purity, due to a greater extraction of the aforementioned minerals.

The high-intensity magnetic fraction then undergoes a first leaching (E) in appropriate equipment (agitation or column tanks) with hydrochloric acid in 20.0% to 30.0% w/w HCl concentration, with a solid-liquid ratio of 1/2 w/w, temperature ranging from 90° C. to 107° C., during a 2 to 4 hour leaching time. The use of a similar technique is currently known, albeit employing an 18.5% HCl solution. However, it has been ascertained that using solutions containing 20% to 25% HCl allows for greater solubilization of primary phosphates, iron oxides, aluminium, manganese and alkaline-earth metals such as calcium, barium and strontium.

After a solid/liquid separation step, the first leach liquor is directed to the rare-earth recovery and HCl regeneration unit (J).

The solid residue from the first leaching is oxidized (F) in a rotary kiln or fluidized bed furnace, under a flow of air or oxygen, at a temperature ranging from 1000° C. and 1100° C., in the presence of a mixture of sodium fluoride (NaF) and amorphous microsilica (SiO$_2$), with an amount of 3% to 10% NaF and 1% to 10% SiO$_2$ with respect to the amount of oxidation-fed material, continuous air injection, with a residence time of 30 to 120 minutes. Those conditions are chosen so that a radionuclide-rich vitreous phase is formed in the boundary of the anatase grains, in addition to promoting radionuclide migration to an iron-rich phase.

The oxidized product is quenched in water (G), in order to stabilize both phases formed thereby (vitreous and iron-rich), thus rendering the forthcoming unit operations more effective.

Following the thermal shock, the oxidized product undergoes a second hydrochloric acid leaching (H) in appropriate equipment (agitation or column tanks) with a 20 to 30% w/w HCl solution, a solid-liquid ratio of 1/2 w/w, temperature ranging from 90° C. to 107° C., for 4 hours, in the presence of NaF or HF, seeking mainly to increase the solubility of the radionuclide-rich vitreous phase, through the action of generated or added fluoride (F$^-$) ion. The use of this operation is currently known, although using an 18.5% HCl solution, without fluoride ion, but rather with air injection.

Following solid/liquid separation, the liquor of the second leach also moves on to the rare-earth recovery and HCl regeneration unit (J), such HCl regeneration taking place through pyrohydrolysis.

The residue of the second leaching undergoes a dry, high-intensity (16000 to 20000 Gauss) magnetic separation (I) in roll or drum equipment with rare-earth magnet, with the objective of extracting the iron-rich and radionuclide-rich which report to the magnetic fraction, the non-magnetic fraction becoming the end product, while the magnetic fraction being rejected. The use of this operation was known in previously described processes, but with magnetic fields of 7000 to 15000 Gauss and aiming at recirculating the iron-rich magnetic fraction in the reduction stage or, else, regarding this magnetic fraction as a by-product, inasmuch as the magnetic fraction showed equally low grades of radionuclides. However, the use of this magnetic fraction is not considered in the present invention, due to its high contents of radionuclide elements. This difference vis-à-vis previous processes is explained by the higher operating selectivity in the high-intensity magnetic separation. Such selectivity is due to the use of rare-earth permanent magnet separators.

The present invention further relates to changes in the sequence of known processes, improvement in practically all unit operations involved and the unique use of radionuclide removal mechanisms. These mechanisms are characterized by the use of $NaF/SiO_2$ mixtures in the oxidation step, followed by fast cooling, in order to form, respectively, a vitreous phase and an iron-rich phase, with high contents of radionuclide elements which can be removed by hydrochloridric acid leaching in the presence of fluoride ion (in the case of the vitreous phase) and high intensity magnetic separation (iron-rich phase).

The nature and scope of the present invention may be fully understood based on the following examples. It should be noticed that said examples are merely illustrative and shall not limit the developed process.

EXAMPLE 1

The sequence of unit operations corresponding to this example is found in FIG. 1 herein. A sample of anatase mechanical concentrate weighing 1000 g and chemical composition as found in Table 1 was submitted to the sequential steps of calcination in air at 500° C. for 30 minutes and reduction with hydrogen at 500° C. for 30 minutes, both performed in the same laboratory scale fluidized bed reactor. After cooling in the furnace itself in nitrogen atmosphere, for purposes of avoiding reoxidation of the magnetic phases formed during reduction, 929 g of the reduced product were processed in a laboratory scale drum and permanent magnet wet separator—field intensity being equal to 800 Gauss. The magnetite-rich magnetic fraction with 284 g was rejected. The 645 g non-magnetic fraction, the chemical composition of which is found in Table 1 herein, was sent to high-intensity magnetic separation, which was carried out in a rare-earth roll and permanent magnet, dry, laboratory separator, with high gradient and field intensity equal to 20000 Gauss. At this stage, 606 g of magnetic concentrate (chemical composition in Table 1 herein) and 39 g of non-magnetic material (basically silicates, phosphates and zirconium minerals) were obtained, the latter 39 g being rejected. The 606 g magnetic concentrate was leached in a 25% w/w HCl solution, with a 1/2 w/w solid-liquid ratio, at 105° C. temperature for 4 hours, in a glass reactor with reflux and mechanical agitation, in bench scale. Following washing, filtering and drying, 472 g of an intermediate concentrate were recovered (chemical composition shown in Table 1 herein). The resulting liquor—rich in iron chlorides, aluminium, phosphorus, rare earths and alkaline-earth metals—was separated and sent to rare-earth and HCl recovery. Next, the leached concentrate was mixed with 11 parts of borax ($Na_2B_4O_7.10H_2O$) and 4 parts of sodium chloride (NaCl), then oxidized in a laboratory rotary horizontal furnace at 950° C., for 60 minutes. The resulting product, the mass of which equals the oxidation-phase feed, was leached with a 25% w/w HCl solution, at 1/2 w/w solid-liquid ratio, at 105° C., for 4 hours, in a glass reactor with reflux and mechanical agitation, in bench scale. After washing, filtering and drying, 382 g of an intermediate concentrate (chemical composition shown in Table 1) were recovered. Finally, the leached product underwent dry, high intensity magnetic separation, in a laboratory separator (rare-earth roll and permanent magnet, high gradient and 20000 Gauss field intensity). The non-magnetic fraction resulting from this final magnetic separation (weighing 313 g and chemical composition shown in Table 1) is the end product. The 79 g magnetic fraction was disposed of. Although containing very reduced contents of the main impurities, the end product still contains 87 parts per million (ppm) of uranium and 119 ppm of thorium—amounts sufficiently high to render this product unsuitable as a raw material for the chloride process of titanium dioxide pigment manufacture. By using, in the oxidation phase, additives more adequate for this purpose it is possible to secure a material with significantly lower contents of radionuclides elements, as shown in the following examples.

TABLE 1

Example 1-contents (mass %) of main elements in different stages of the concentration process

| | Material | | | | | |
|---|---|---|---|---|---|---|
| | (1) | (2) | (3) | (4) | (5) | (6) |
| Mass, g | 1000 | 645 | 606 | 472 | 382 | 313 |
| $TiO_2$ | 51.60 | 65.70 | 68.60 | 81.90 | 88.10 | 91.60 |
| Fe (total) | 18.40 | 12.60 | 10.90 | 9.28 | 7.94 | 5.33 |
| $Al_2O_3$ | 5.74 | 3.89 | 1.79 | 0.47 | <0.15 | <0.15 |
| CaO | 1.05 | 1.11 | 0.78 | 0.29 | 0.08 | 0.07 |
| $P_2O_5$ | 4.85 | 4.11 | 3.90 | 2.49 | 0.41 | 0.43 |
| $SiO_2$ | 0.86 | 0.67 | 0.47 | 0.48 | 0.47 | 0.35 |
| $Nb_2O_5$ | 0.71 | 1.05 | 0.88 | 1.17 | 1.26 | 1.36 |
| $ZrO_2$ | 0.41 | 0.58 | 0.73 | 0.92 | 0.91 | 1.07 |
| U (ppm) | >150 | >150 | >150 | >150 | 97 | 87 |
| Th (ppm) | >500 | >500 | 486 | 256 | 125 | 119 |

(1) mechanical concentrate
(2) concentrate after low intensity magnetic separation
(3) concentrate after high intensity magnetic separation
(4) concentrate after first HCl leaching
(5) concentrate after second HCl leaching
(6) final concentrate

EXAMPLE 2

A 1000 g sample of the same mechanical concentrate as in Example 1 hereinabove was submitted to sequential steps of calcination at 500° C. for 30 minutes and reduction with hydrogen at 500° C. for 5 minutes, both in the same laboratory scale fluidized bed reactor. The reduced material was then subjected to the same sequence of unit operations described in Example 1 hereinabove until the oxidation stage, that is: wet, low-intensity magnetic separation, dry, high-intensity magnetic separation and leaching with 25% w/w hydrochloric acid at 105° C., for 4 hours. After washing, filtering and drying, the leached, intermediate concentrate presented a mass of 414 g and chemical composition as shown in Table 2 below. This material was then mixed with 6.7 parts of sodium fluoride and 3.3 parts of amorphous silica, thereafter to be calcinated in a laboratory rotary horizontal furnace, with continuous flow of air at 1100° C., for 60 minutes. The oxidation product, the mass of which equaled the feeding, was suddenly quenched in a water bath and, then, leached with 25% w/w hydrochloridric acid, with 1/2 w/w solid-liquid ratio, for 4 hours, at 105° C., in a glass reactor with reflux and mechanical agitation, in bench scale. Following washing, filtering and drying, 335 g of an intermediate concentrate (chemical composition shown in Table 2) were recovered. At the end, the leached product went through a laboratory separator (rare-earth role and permanent magnet, high gradient and 20000 Gauss field intensity). The non-magnetic fraction obtained in this final magnetic separation—weighing 318 g and chemical composition shown in Table 2—is the end product. The 17 g magnetic fraction mass was rejected. Using a mixture of sodium fluoride and amorphous silica in the oxidation step and the use of sudden cooling in water of the oxidized product provided a substantial reduction in the contents of uranium and thorium in the end product. However, the final concentrate displayed relatively high content of silica, with a consequent reduction of its TiO$_2$ grade. This problem can be solved by conducting the second hydrochloric leach (following oxidation) with sodium fluoride, in order to increase the solubility of the radionuclide-rich vitreous phase, through the action of the F$^-$ion generated during leaching. This fact will be illustrated in Example 3 below.

TABLE 2

Example 2-contents (mass %) of main elements in different stages of the concentration process

| | Material | | | | | |
|---|---|---|---|---|---|---|
| Mass, g | (1) 1000 | (2) 658 | (3) 628 | (4) 414 | (5) 335 | (6) 318 |
| TiO$_2$ | 51.60 | 65.60 | 66.40 | 83.20 | 84.50 | 88.20 |
| Fe (total) | 18.40 | 10.90 | 11.60 | 9.28 | 7.81 | 3.32 |
| Al$_2$O$_3$ | 5.74 | 2.20 | 2.00 | 0.60 | <0.15 | <0.15 |
| CaO | 1.05 | 1.07 | 0.89 | 0.33 | 0.10 | 0.10 |
| P$_2$O$_5$ | 4.85 | 4.34 | 4.18 | 3.35 | 0.62 | 0.68 |
| SiO$_2$ | 0.86 | 0.84 | 0.35 | 0.77 | 3.99 | 4.43 |
| Nb$_2$O$_5$ | 0.71 | 0.83 | 0.82 | 1.36 | 1.27 | 1.46 |
| ZrO$_2$ | 0.41 | 0.75 | 0.79 | 1.12 | 0.97 | 1.12 |
| U (ppm) | >150 | >150 | >150 | >150 | 58 | 62 |
| Th (ppm) | >500 | 466 | 482 | 236 | 73 | 53 |

(1) mechanical concentrate
(2) concentrate after low intensity magnetic separation
(3) concentrate after high intensity magnetic separation
(4) concentrate after first HCl leaching
(5) concentrate after second HCl leaching
(6) final concentrate

EXAMPLE 3

A 1000 g sample of the same anatase mechanical concentrate as shown in Examples 1 and 2 hereinabove was subjected to the identical sequence of unit operations described in Example 2, namely: calcination in air (30 minutes) and reduction with hydrogen (5 minutes) in fluidized bed at 500° C., wet, low intensity magnetic separation, dry, high intensity magnetic separation and leaching with 25% w/w hydrochloric acid, at 105° C., during 4 hours, all these operations in bench scale. After leaching, washing, filtering and drying, 410 g of an intermediate concentrate (chemical composition indicated in Table 3) were recovered. The leached product was then mixed with 6.7 parts of sodium fluoride and 3.3 parts of amorphous silica, being afterwards calcinated in a laboratory rotary horizontal furnace, with continuous flow of air, at 1100° C., for 60 minutes. The oxidized ore was rapidly cooled in water and leached in 25% w/w HCl in the presence of sodium fluoride (amount equal to 40 g of NaF per liter of leaching solution), 1/2 w/w solid-liquid ratio, for 4 hours at 105° C., in a glass reactor with reflow and mechanical agitation, in bench scale. After washing, filtering and drying, 323 g of an intermediate concentrate (chemical composition shown in Table 3) were recovered. At the end, the leached product went through a laboratory magnetic separator (rare-earth roll and permanent magnet, high gradient and 20000 Gauss field intensity). The resulting non-magnetic fraction (with 312 g mass and chemical composition shown in Table 3) is the end product. The 11 g magnetic fraction mass was discarded. Using a sodium fluoride and amorphous silica mixture in oxidation and a rapid cooling in water of the oxidized product, plus the addition of sodium fluoride during the second HCl leaching, made it possible to secure a final product with a high TiO$_2$ grade and low contents of impurities that are harmful for the chloride process of titanium dioxide pigment manufacture. Moreover, the amounts of radionuclides in this product comply with environmental regulations regarding the use of raw materials and effluent discharge currently imposed worldwide on the titanium dioxide pigment industry.

TABLE 3

Example 3-contents (mass %) of main elements in different stages of the concentration process

| | Material | | | | | |
|---|---|---|---|---|---|---|
| Mass, g | (1) 1000 | (2) 661 | (3) 627 | (4) 410 | (5) 323 | (6) 312 |
| TiO$_2$ | 51.60 | 65.60 | 66.40 | 83.20 | 91.00 | 92.40 |
| Fe (total) | 18.40 | 10.90 | 11.60 | 5.13 | 2.40 | 2.39 |
| Al$_2$O$_3$ | 5.74 | 2.20 | 2.00 | 0.60 | 0.25 | 0.24 |
| CaO | 1.05 | 1.07 | 0.89 | 0.33 | 0.09 | 0.08 |
| P$_2$O$_5$ | 4.85 | 4.34 | 4.18 | 3.35 | 2.00 | 1.23 |
| SiO$_2$ | 0.86 | 0.84 | 0.35 | 0.77 | 0.55 | 0.51 |
| Nb$_2$O$_5$ | 0.71 | 0.83 | 0.82 | 1.36 | 1.49 | 1.50 |
| ZrO$_2$ | 0.41 | 0.75 | 0.79 | 1.12 | 1.30 | 1.45 |
| U (ppm) | >150 | >150 | >150 | >150 | 55 | 52 |
| Th (ppm) | >500 | 466 | 482 | 236 | 57 | 50 |

(1) mechanical concentrate
(2) concentrate after low intensity magnetic separation
(3) concentrate after high intensity magnetic separation
(4) concentrate after first HCl leaching
(5) concentrate after second HCl leaching
(6) final concentrate

EXAMPLE 4

A 1000 kg sample of the same anatase mechanical concentrate of Examples 1, 2 and 3 and with a chemical composition as shown in Table 4 below went through, in different batches, the sequence steps of calcination in air (500° C. for 30 minutes) and reduction with hydrogen (500° C. for 5 minutes). Both operations were done in the same pilot scale, fluidized bed reactor, capable of processing up to 50 kg of ore per batch. In each batch, the reduced ore was cooled in flow of nitrogen in the fluidized bed reactor, in order to avoid reoxidation of iron oxides formed during reduction. At the end of this stage, 945 kg of reduced ore were recovered and, then, wet processed in a magnetic separator of drum and permanent magnet, in pilot scale, with 800 Gauss field intensity. At this stage, 670 kg of non-magnetic material (chemical composition shown in Table 4) were obtained, while 275 kg of a magnetic product were discarded. The non-magnetic fraction underwent high-intensity magnetic separation, with high gradient, in a rare-earth drum, permanent magnet pilot separator, capable of processing up to 1.5 ton of ore per hour. This operation was carried out dry, with 20000 Gauss field intensity. As a result, 630 kg of magnetic concentrate and 40 kg of non-magnetic reject were obtained. The magnetic concentrate underwent leaching with hydrochloric acid in a 1200 mm high leach pilot column with three cylinder sections (305 mm, 255 mm and 200 mm diameters), capable of processing 40 kg of ore per batch. Leaching experimental conditions were: 4 hours residence time, temperature ranging from 100° C. to 105° C. in the middle of the column and a 25% w/w HCl leaching solution. At the end of each batch, the ore was exhaustively washed with water in the column itself, the washing water being disposed of. Leached ore was then removed manually through the lid of the column. As a result of this operation, 422 kg of concentrate (chemical composition shown in Table 4) were recovered. A total of 55 kg of sodium fluoride and 30 kg of amorphous silica were then mixed to the concentrate mass and the mixture was oxidized in a semi-industrial scale rotary horizontal furnace. This furnace (50 cm internal diameter, 8 m long) has a carbon steel outer shell, inner refractory brick lining and heating through diesel oil burning. Oxidation operating conditions were: temperature of 1050° C. to 1100° C. and 75 minutes of ore residence time. At the furnace outlet, the calcination product was discharged into recipients with room temperature water, so as to promote thermal shock of the ore. As a result of this operation, 400 kg of oxidized ore were recovered and then subjected to a second hydrochloric acid leach. This operation took place in the same previously mentioned column leaching pilot unit, under the following conditions: 4 h duration, slurry temperature between 100° C. and 105° C., with 25% w/w HCl, with addition of 40 g per liter of sodium fluoride to the leaching solution. As was the case in the first leaching, at the end of each batch, the leached ore was exhaustively washed with water. As a result, 325 kg of leached concentrate (chemical composition shown in Table 4) were recovered. Finally, the material from the second HCl leaching was processed in a dry, pilot magnetic separator (rare-earth roll and permanent magnet, high gradient and 20000 Gauss field intensity) capable of processing up to 0.5 ton of ore per hour. A total of 302 kg of non-magnetic product and 23 kg of magnetic reject were recovered. The non-magnetic material (composition illustrated in Table 4) was the end product.

TABLE 4

Example 4-contents (mass %) of main elements in different stages of the concentration process

| | Material | | | | | |
|---|---|---|---|---|---|---|
| Mass, kg | (1) 1000 | (2) 670 | (3) 630 | (4) 422 | (5) 325 | (6) 302 |
| $TiO_2$ | 51.60 | 63.72 | 64.00 | 82.50 | 93.00 | 94.00 |
| Fe (total) | 18.40 | 11.50 | 12.00 | 4.83 | 2.15 | 1.97 |
| $Al_2O_3$ | 5.74 | 2.41 | 2.44 | 0.68 | 0.25 | 0.24 |
| CaO | 1.05 | 1.08 | 0.91 | 0.29 | 0.12 | 0.08 |
| $P_2O_5$ | 4.85 | 4.46 | 4.27 | 2.95 | 0.56 | 0.34 |
| $SiO_2$ | 0.86 | 0.88 | 0.53 | 0.82 | 0.52 | 0.50 |
| $Nb_2O_5$ | 0.71 | 0.84 | 0.83 | 1.35 | 1.49 | 1.49 |
| $ZrO_2$ | 0.41 | 0.84 | 0.83 | 1.00 | 1.19 | 0.91 |
| U (ppm) | >150 | >150 | >150 | >150 | 79 | 46 |
| Th (ppm) | >500 | 425 | 430 | 232 | 90 | 44 |

(1) mechanical concentrate
(2) concentrate after low intensity magnetic separation
(3) concentrate after high intensity magnetic separation
(4) concentrate after first HCl leaching
(5) concentrate after second HCl leaching
(6) final concentrate

The invention claimed is:

1. A process to obtain titanium concentrates with high contents of $TiO_2$ and low contents of radionuclide elements from anatase mechanical concentrates, said process comprising the steps of:

(a) calcinating ore in a fluidized bed or rotary kiln in a temperature range of 400° C. to 550° C. for 30 minutes to one hour, converting hydrated iron oxides into hematite and reducing time necessary for a next reduction step, to form a calcinated product;

(b) conducting reduction of the calcinated product in the fluidized bed or rotary kiln at 400° C. to 550° C. for 5 to 30 minutes, using hydrogen, carbon monoxide, natural gas or any other reducing gas to convert hematite into magnetite, to form a reduced product having a first magnetic fraction;

(c) conducting low-intensity magnetic separation of the reduced product in drum separators in a 600 to 800 Gauss magnetic field, thereby extracting the first magnetic fraction formed in the reduction stage, to form a low-intensity non-magnetic fraction;

(d) conducting a dry, high-intensity magnetic separation of the low-intensity non-magnetic fraction in a drum or roll separator and a rare-earth permanent magnet in a 16000 to 20000 Gauss magnetic field, thereby extracting a second magnetic fraction from silicates, secondary phosphates, monazite, calzirtite, zirconolite and uranium and thorium bearing minerals, to form a high-intensity magnetic fraction;

(e) conducting hydrochloric acid leaching of the high-intensity magnetic fraction, in agitation or column tanks, with 20 to 30% w/w HCl, in a 1/2 w/w solid-liquid ratio at a temperature between 90° C. and 107° C. for 2 to 4 hours, thereby solubilizing primary phosphates, iron oxides, aluminium, magnesium, barium and calcium, to form a leached product;

(f) conducting filtration of the leached product in a belt filter, to form a first filtrated product;

(g) drying of the first filtrated product in a rotary or fluidized-bed drier, to form a first dried product;

(h) oxidizing of the first dried product in a rotary kiln or fluidized bed reactor, under a flow of air or oxygen at a temperature range of 1000° C. to 1100° C. in a presence of a mixture of sodium fluoride (NaF) and amorphous silica ($SiO_2$), in a 3% to 10% NaF and 1% to 10% $SiO_2$ proportion with respect to an amount of material fed to oxidation, thereby forming in a boundary of anatase grains a radionuclide-rich vitreous phase in addition to promoting radionuclide migration to an iron-rich phase, to form an oxidation product;

(i) quenching the oxidation product in water, thereby respectively stabilizing the vitreous and the iron-rich phases, to form a first quenched product;

(j) conducting hydrochloric acid leaching of the first quenched product in agitation or column tanks with 20 to 30% w/w HCl with in a 1/2 w/w solid-liquid ratio at a 90° C. to 107° C. temperature range for 2 to 4 hours, in a presence of sodium fluoride (NaF) or hydrofluoric acid (HF), thereby solubilizing a radionuclide-rich vitreous phase through generated or added fluoride ion ($F^-$) action, to form a second leached product;

(k) filtering of the second leached product in a belt filter, to form a second filtrated product;

(l) drying of the second filtrated product in a rotary or fluidized bed drier, to form a second dried product;

(m) conducting dry, high-intensity magnetic separation of the second dried product in a 16000 to 20000 Gauss magnetic field in a drum or roll separator and rare-earth permanent magnet, thereby separating an iron containing, radionuclide rich magnetic fraction from a non-magnetic fraction, the non-magnetic fraction becoming the end product concentrate and the iron containing, radionuclide rich magnetic fraction being discarded.

2. The process according to claim 1, wherein the reduction in step (b) is carried out at 500° C. for 5 minutes.

3. The process according to claim 1, wherein the magnetic field used in the dry, high intensity magnetic separation in step (d) forming the high-intensity magnetic fraction is 20000 Gauss magnetic field.

4. The process according to claim 1, wherein the hydrochloric acid leaching in step (e) is carried out using a solution containing 20% to 25% w/w HCl for 4 hours at a temperature of 150° C.

5. The process according to claim 1, wherein the oxidation in step (h) is carried out in a rotary horizontal kiln or in a fluidized bed with 6% to 7% NaF and 3% to 4% $SiO_2$ with respect to an amount of material fed to oxidation, under continuous air or oxygen injection, for a duration of 30 to 120 minutes.

6. The process according to claim 1, wherein the hydrochloric acid leaching in step (j) is carried out with a solution containing 25% w/w HCl for 4 hours at a temperature of 105° C. and in the presence of sodium fluoride or hydrofluoric acid, with an amount ranging from 10 g to 30 g of fluoride ion ($F^-$) per liter of leaching solution.

7. The process according to claim 1, wherein the magnetic field used in the dry, high-intensity magnetic separation of the second dried product in step (m) is a 20000 Gauss magnetic field.

* * * * *